US011987055B2

(12) United States Patent
Lum et al.

(10) Patent No.: US 11,987,055 B2
(45) Date of Patent: May 21, 2024

(54) FLUIDIC DIES

(71) Applicant: HEWLETT-PACKARD DEVELOPMENT COMPANY, L.P., Spring, TX (US)

(72) Inventors: Jacob Lum, Corvallis, OR (US); Jeremy Sells, Corvallis, OR (US); Si-lam Choy, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 93 days.

(21) Appl. No.: 17/667,463

(22) Filed: Feb. 8, 2022

(65) Prior Publication Data

US 2022/0161564 A1 May 26, 2022

Related U.S. Application Data

(63) Continuation of application No. 16/640,563, filed as application No. PCT/US2017/057394 on Oct. 19, 2017, now Pat. No. 11,325,385.

(51) Int. Cl.
*B41J 2/175* (2006.01)
*B41J 2/14* (2006.01)
*B41J 2/045* (2006.01)

(52) U.S. Cl.
CPC ............. *B41J 2/175* (2013.01); *B41J 2/1404* (2013.01); *B41J 2/0458* (2013.01);
(Continued)

(58) Field of Classification Search
CPC ........ B41J 2/175; B41J 2/1404; B41J 2/0458; B41J 2/14145; B41J 2002/14403;
(Continued)

(56) References Cited

U.S. PATENT DOCUMENTS 5,566,809 A * 10/1996 Vogt ........................ G07F 1/045 194/348
5,637,166 A 6/1997 Swanson et al.
(Continued)

FOREIGN PATENT DOCUMENTS

CN 103826860 5/2014
CN 106985517 7/2017
(Continued)

OTHER PUBLICATIONS

Yamamoto, T; Droplet Discharge Head Of Inkjet Recording Device, Has Individual Supply/recovery Flow Paths Whose Cross-sectional Area Gradually Reduces Toward Pressure Chamber/common Recovery Flow Path From Common Supply Flow Path/pressure Chamber, Jan. 19, 2012, Japan, All Pages (Year: 2012).*
(Continued)

*Primary Examiner* — Justin Seo
*Assistant Examiner* — Tracy M McMillion
(74) *Attorney, Agent, or Firm* — Foley & Lardner LLP

(57) ABSTRACT

A fluidic die may include a fluid channel layer defining a number of fluid channels therein, a slot layer disposed on a side of the fluid channel layer, and a first fluid slot and a second fluid slot defined in the slot layer. At least one of the fluid channels fluidically couples the first fluid slot to the second fluid slot. The first fluid slot and the second fluid slot are defined in the slot layer along a length of the fluidic die.

18 Claims, 10 Drawing Sheets

(52) U.S. Cl.
CPC .. *B41J 2/14145* (2013.01); *B41J 2002/14403* (2013.01); *B41J 2002/14467* (2013.01); *B41J 2202/12* (2013.01)

(58) Field of Classification Search
CPC .......... B41J 2002/14467; B41J 2202/12; B41J 2002/14459; B41J 2202/20
See application file for complete search history.

(56) References Cited

U.S. PATENT DOCUMENTS

| | | | | |
|---|---|---|---|---|
| 6,280,013 | B1 | 8/2001 | Wade et al. | |
| 7,690,760 | B2 * | 4/2010 | Maher | B41J 2/1404 347/61 |
| 8,814,293 | B2 | 8/2014 | Struck et al. | |
| 2003/0081027 | A1 | 5/2003 | Feinn et al. | |
| 2004/0145633 | A1 | 7/2004 | Lim | |
| 2005/0259127 | A1 * | 11/2005 | Enomoto | B41J 2/14233 347/40 |
| 2006/0131264 | A1 | 6/2006 | Kawamura | |
| 2011/0128335 | A1 | 6/2011 | Von Essen | |
| 2012/0113197 | A1 * | 5/2012 | Kashu | B41J 2/1433 347/89 |
| 2012/0160925 | A1 | 6/2012 | Hoisington | |
| 2014/0362143 | A1 | 11/2014 | Govyadinov | |
| 2016/0009082 | A1 | 1/2016 | Chen et al. | |
| 2016/0129690 | A1 | 5/2016 | Ge | |

FOREIGN PATENT DOCUMENTS

| | | |
|---|---|---|
| EP | 3299171 | 3/2018 |
| JP | 2007522971 | 8/2007 |
| JP | 2008087471 | 4/2008 |
| JP | 2009-202474 | 9/2009 |
| JP | 2013532594 | 8/2013 |
| JP | 2014531349 | 11/2014 |
| JP | 2014237323 | 12/2014 |
| JP | 2015150881 | 8/2015 |
| JP | 2016159514 | 9/2016 |
| JP | 2016215626 | 12/2016 |
| JP | 2017061057 | 3/2017 |
| JP | 2017124615 | 7/2017 |
| JP | 2017144571 | 8/2017 |
| WO | WO-2010050959 | 5/2010 |
| WO | WO-2012054017 | 4/2012 |
| WO | WO-2013048382 | 4/2013 |
| WO | WO-2014003772 | 1/2014 |
| WO | WO-2015022833 | 2/2015 |
| WO | WO-2016068988 | 5/2016 |
| WO | WO-2016122528 | 8/2016 |
| WO | WO-2016137490 A1 | 9/2016 |
| WO | WO-2017002778 | 1/2017 |

OTHER PUBLICATIONS

HP PageWide Technology; Dec. 2, 2016; http://h20195.www2.hp.com/V2/GetPDF.aspx/4AA4-3489ENW.

* cited by examiner

FLUIDIC DIES

BACKGROUND

Fluidic dies are any fluid flow structure or die that moves fluid through a number of channels within its various layers of material. One type of fluidic die is a fluid ejection die that ejects fluid from the die in order to precisely target the ejected fluid onto a substrate such as when printing an image on a print medium. A fluid ejection die in a fluid cartridge or print bar may include a plurality of fluid ejection elements on a surface of a silicon substrate. By activating the fluid ejection elements, fluids may be printed on substrates. The fluid ejection die may include an array of resistive or piezoelectric elements used to cause fluid to be ejected from the fluid ejection die. The fluids are caused to flow to the fluid ejection elements through slots and channels that are fluidically coupled to chambers in which the fluid ejection elements reside.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1A:
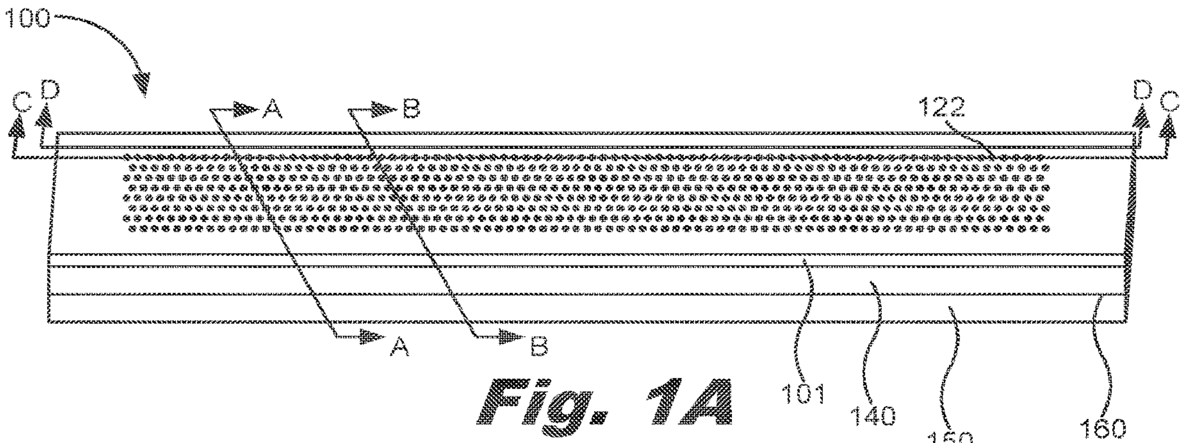
FIG. 1A is a perspective view of a fluidic die, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Because many fluidic dies utilize thermal resistive actuators to move or eject fluid throughout and from the fluidic die, respectively, heat within the fluidic die may build up and cause the fluids to eject from the die in unexpected ways and cause a heat gradient to become present along the dimensions of the fluidic die.

Further, because some fluids such as inks used within the fluidic die include particulate matter that may settle, the fluids may cause a viscous plug to occur within the channels or ejection nozzles of the fluidic die. Some of these fluids may include printable fluids. Printable fluids may include inks, toners, varnishes, glosses, binding agents, fusion agents, defining agents, biological agents, and biological samples, among other printable fluids. In some examples, the fluids used in printing, for example, may include inks and other fluids that contain solids such as pigments. Fluids that include pigments may suffer from pigment settling. Pigments may be insoluble in a printable fluid such as an ink vehicle, and may form discrete particles that clump or agglomerate if they are not stabilized in the printable fluid. Pigment settling rates may be due to differences in pigment size, density, shape, or degree of flocculation. To prevent the pigments from agglomerating or settling out of the printable fluid, the pigments may be uniformly dispersed in the printable fluid and stabilized in the dispersed form until the printable fluid is used for printing. The pigment may be present in the printable fluid in a distribution of particle sizes, which may be selected based on performance attributes, such as stability, gloss, and optical density ("OD"), among others.

Further, with pigment settling, decapping may be used to ensure that the printable fluid with its pigments are ready to print without creating undesirable print errors. Pigment settling causes clogging of nozzles through which the fluid ejection elements eject the printable fluid, resulting in less than optimal printing performance including, for example, a print swath having less than optimum height. If this pigment settling is not catastrophic, the nozzles may be recovered by successive steps of pen servicing in the associated printing device in the form of a decapping process. However, while the decapping process may be used to ensure that the ejection of the printable fluid occurs as intended, it takes time to perform such a process, and slows down the production of a printed product.

For example, print quality and speed may be limited by a rate of fluid ejection chamber refill and heat removal from the silicon on the fluidic die. Some challenging fluids may include a high viscosity fluids due to high solids content. These fluids may benefit from recirculation and through-silicon recirculation (TSR) to prevent pigment settling and viscous plug formation in the channels and nozzles from evaporation.

Recirculation pumps used to move the fluid through the channels may generate pockets of air in a recirculation loop. These pockets of air may lead to print defects, servicing downtime, and thermal runaway in connection with the uR pumps used to move the fluid in the channels and fluid actuators used to eject the fluid from the fluidic die. The added heat payload and associated risks of air generation limits the maximum fluid flux the fluidic die may achieve before initiating fluid outgassing, thermal runaway, and fluidic die failure.

The introduction of an on-silicon die pressure driven recirculation system may eliminate the need for an inertial drive bubble recirculation pump and its associated duty cycle. The recirculation system may be used to internally service the fluidic die by purging the architecture region of the fluidic die with fluid or a washing fluid in order to remove air, settled pigments, and particles. The reduced duty cycle and ability to recirculate fresh fluid may also lower the operating temperatures of the fluidic die by improving heat transfer from the bulk silicon portions of the fluidic die to bulk fluid flow that flows out of the fluidic die to and through an external heat exchanger or fluid recycling system such as, for example, a filter, a heat exchanger, a fluid reservoir, other heat exchanging systems and elements, or combinations thereof.

Thus, recirculation of the printable fluid may be used to ensure that pigment settling and subsequent capping of the nozzles does not occur or is mitigated. Recirculation processes include forming a number of recirculation channels within or adjacent to the firing chambers, fluid ejection elements, and nozzles of a printhead. A number of external and/or internal pumps may be used to move the printable fluid through the recirculation channels. The recirculation channels serve as by-pass fluidic paths, and along with the internal and external pumps, recirculate the printable fluid through the firing chambers. However, waste heat generated by the recirculation pumps, which may take the form of resistive elements, stays in the printable fluid, and increases the temperature of the printhead die including, for example, silicon layers within the printhead die. This increase of temperature creates user-perceptible thermal defects within printed media. This may limit the wide use of recirculation and its benefit of reducing or eliminating pigment settling and capping of nozzles.

Although some printhead and printhead die architectures are able to maintain low operating temperatures, waste heat from the recirculation system including its internal resistor-based pumps may increase the waste heat above a desired operating temperature. Further, in some printhead and printhead die architectures, recirculation system designs may place channels too far from a fluid feed hole (e.g., and ink feed hole (IFH)), the firing chambers, the fluid ejection elements, the nozzles, or combinations thereof to effectively cool the die or replenish the fluid ejection elements with fresh fluid.

Examples described herein provide a number of fluidic dies. The fluidic dies may include a fluid channel layer defining a number of fluid channels therein, a slot layer disposed on a side of the fluid channel layer, and a first fluid slot and a second fluid slot defined in the slot layer. At least one of the fluid channels fluidically couples the first fluid slot to the second fluid slot. The first fluid slot and the second fluid slot are defined in the slot layer along a length of the fluidic die.

The fluidic dies may include a fluid ejection layer fluidically coupled to the fluid channels via a number of fluid feed holes defined within the fluid ejection layer. The fluid ejection layer may include a number of fluid ejection actuators disposed in a number of fluid ejection chambers, and a number of nozzles corresponding to the number of fluid ejection chambers. The fluid channels may be defined within the fluid channel layer based on an arrangement of the fluid ejection actuators within the fluid ejection layer.

The fluidic die may include a silicon-on-insulator (SOI) layer disposed between the fluid channel layer and the slot layer, and a first SOI aperture and a second SOI aperture defined in the SOI layer. The first and second SOI layers may fluidically couple the first fluid slot and a second fluid slot to a least one of the fluid channels. The fluid channels defined in the fluid channel layer form a number of ribs or posts between the fluid channels.

The fluidic die may include at least one inter-channel passage defined in a rib or post separating two of the number of fluid channels. The inter-channel passage fluidically couples a fluid ejection chamber to two adjacent fluid channels, and a microfluidic pump disposed within the inter-channel passage to pump fluid from a first fluid channel, through the inter-channel passage, past one of the first fluid ejection actuators disposed one of the fluid ejection chambers, and into a second channel adjacent the first fluid channel.

A first fluid channel may fluidically couple the first fluid slot to the second fluid slot and two adjacent fluid channels may be fluidically coupled to the first fluid slot but not the second fluid slot. The fluidic die may include a number of inter-channel passages defined in a number of ribs or posts separating each fluid channel of the number of fluid channels. The inter-channel passages fluidically couple a fluid ejection chamber to adjacent fluid channels. Fluid flowing from the first slot into the two adjacent fluid slots flows through the inter-channel passages into the first fluid channel.

Examples described herein also provide a system for recirculating fluid within a fluidic die. The system may include a fluid reservoir, and a fluid channel layer defining a number of fluid channels therein. The fluid channel layer may be fluidically coupled to the fluid reservoir. The system may also include a slot layer disposed on a side of the fluid channel layer fluidically proximal to the fluid reservoir, and a first fluid slot and a second fluid slot defined in the slot layer. At least one of the fluid channels may fluidically couple the first fluid slot to the second fluid slot. The first fluid slot and the second fluid slot may be defined in the slot layer along a length of the fluidic die.

The system may include a fluidic die where the fluidic die includes a fluid ejection layer. The fluid ejection layer may include a number of fluid ejection actuators disposed in a number of fluid ejection chambers, and a number of nozzles. The fluid channels may be fluidically coupled to the fluid ejection chambers via a number of fluid feed holes defined within the fluid ejection layer. The fluid channels may be defined within the fluid channel layer based on an arrangement of the fluid ejection actuators within the fluid ejection layer.

The system may include a silicon-on-insulator (SOI) layer disposed between the fluid channel layer and the slot layer and a first SOI aperture and a second SOI aperture defined in the SOI layer. The first and second SOI layers may fluidically couple the first fluid slot and a second fluid slot to a least one of the fluid channels. The fluid channels defined in the fluid channel layer may form a number of ribs or posts between the fluid channels.

The system may include at least one inter-channel passage defined in a rib or post separating two of the number of fluid channels. The inter-channel passage may fluidically couple a fluid ejection chamber to two adjacent fluid channels. A microfluidic pump may be disposed within the inter-channel passage to pump fluid from a first fluid channel, through the inter-channel passage, past one of the first fluid ejection actuators disposed one of the fluid ejection chambers, and into a second channel adjacent the first fluid channel.

A first fluid channel may fluidically couple the first fluid slot to the second fluid slot and two adjacent fluid channels are fluidically coupled to the first fluid slot but not the second fluid slot. The fluidic die may further include a number of inter-channel passages defined in a number of ribs or posts separating each fluid channel of the number of fluid channels. The inter-channel passages fluidically couple a fluid ejection chamber to adjacent fluid channels. Fluid flowing from the first slot into the two adjacent fluid slots flows through the inter-channel passages into the first fluid channel. The system may include an external pump external to the fluidic die and fluidically coupled to the first slot to create a pressure differential between the first slot and the second slot, and a heat exchange device to cool the fluid as the fluid exits the fluidic die via the second slot.

As used in the present specification and in the appended claims, the term "actuator" refers any device that ejects fluid from a nozzle or any other non-ejecting actuator. For example, an actuator, which operates to eject fluid from the nozzles of a fluid ejection die may be, for example, a resistor that creates cavitation bubbles to eject the fluid or a piezoelectric actuator that forces fluid from the nozzles of a fluid ejection die. A recirculation pump, which is an example of a non-ejecting actuator, moves fluid through passages, channels, and other pathways within the fluid ejection die, and may be any resistive device, piezoelectric device, or other microfluidic pump device.

Further, as used in the present specification and in the appended claims, the term "nozzle" refers to an individual component of a fluid ejection die through which a fluid is dispensed onto a surface. The nozzle may be associated that at least one ejection chamber and an actuator used to force the fluid out of the ejection chamber through the opening of the nozzle.

Further, as used in the present specification and in the appended claims, the term "fluid printing cartridge" may refer to any device used in the ejection of fluids such as inks onto a print medium. In general, a printing fluid cartridge may be a fluidic ejection device that dispenses fluid such as ink, wax, polymers, biofluids, reactants, analytes, pharmaceuticals, or other fluids. A fluid printing cartridge may include at least one fluid ejection die. In some examples, a fluid printing cartridge may be used in printing devices, three-dimensional (3D) printing devices, graphic plotters, copiers, and facsimile machines, for example. In these examples, a fluid ejection die may eject ink, or another fluid, onto a print medium such as paper to form a desired image or otherwise place an amount of the fluid on a digitally addressed portion of the print medium.

Further, as used in the present specification and in the appended claims, the term "length" refers to the longer or longest dimension of an object as depicted, whereas "width" refers to the shorter or shortest dimension of an object as depicted.

Even further, as used in the present specification and in the appended claims, the term "a number of" or similar language is meant to be understood broadly as any positive number including 1 to infinity.

Turning now to the figures, FIGS. 1A is a perspective view of a fluidic die (100), according to an example of the principles described herein. FIGS. 1B through 1E are cut-away views of the fluidic die (100) of FIG. 1A along line A-A, B-B, C-C, and D-D, respectively, as depicted in FIG. 1A, according to an example of the principles described herein. The fluidic die (100) of FIGS. 1A through 1E include elements that are common among the examples described herein.

The fluidic die (100) includes a fluid channel layer (140). The fluid channel layer (140) includes a number of fluid channels (104) formed in the channel layer to allow for fluid to travel along a width of the fluidic die (100). The fluid channels (104) defined in the fluid channel layer (140) form a number of ribs or posts between the fluid channels (104). These ribs or posts formed from the fluid channels (104) may be continuous or discontinuous along their length. A fluid slot layer (150) may be disposed on a side of the fluid channel layer (140) opposite a fluid ejection layer (101). The slot layer (150) includes at least two slots (151, 152) formed therein. The slots (151, 152) include a first fluid slot (151) and a second fluid slot (152) defined in the slot layer (150) along a length of the fluidic die (100) and on opposite sides of the fluidic die (100) relative to the width of the fluidic die (100). The slots (151, 152) are fluidically coupled to the fluid channels (104) through the slot layer (150) and the channel layer (140) such that fluid that enters from the bottom of the fluidic die (100) as depicted by the arrows depicted in the fluid slots (151, 152) enter fluidic die through the first fluid slot (151) and exit the fluidic die (100) through the second fluid slot (152).

In this manner, the fluid enters the fluidic die (100) through the first fluid slot (151), travels through a number of channels (104) defined in the channel layer (140), enters the second fluid slot (152), and returns to a fluid source, for example. Some of the fluid that enters the fluid die (100) is ejected from the fluid ejection layer (101), but the movement of the fluid through the fluid slots (151, 152) and the fluid channels (104) ensures that no viscous plugs form along the path of the fluid travel including within the fluid slots (151, 152), the fluid channels (104), and fluid feed holes (108), fluid ejection chambers (110), and nozzle apertures (112) of the fluid ejection layer (101). Further, the flow of fluid through the fluid slots (151, 152) and the fluid channels (104) acts as a cooling system to cool actuators disposed within the fluidic die (100) including fluid ejection actuators (114) that eject fluid from the fluidic die (100) through the fluid ejection layer (101), and non-ejecting actuators that move fluid through passages, channels, and other pathways within the fluidic die (100).

In the examples described herein, fluid from, for example, a fluid reservoir (FIG. 7, 750) may be fluidically coupled to the slots (151, 152) to loop fluid into and out of the fluidic die (100). Further, in one example, a heat exchanger (FIG. 7, 751) may be included in or fluidically coupled to the fluid reservoir (750) to dissipate heat from the fluid after it has been moved through the fluidic die (100) and gathered heat. A filter (FIG. 7, 752) may also be included in or fluidically coupled to the fluid reservoir (750) to filter any impurities from the fluid. Because the fluid channels (104) are formed in the fluid channel layer (140), more heat may be collected by the fluid, recirculated through the fluidic die (100), and dissipated through the use of the heat exchanger (FIG. 7, 751) and fluid reservoir (750).

At least one of the fluid channels (104) fluidically couples the first fluid slot (151) to the second fluid slot (152). As is described in more detail herein, the fluid channels (104) may be formed at a diagonal across the width of the fluidic die. However, the fluid channels (104) maybe formed at any angle across the width of the fluidic die (100) in order to fluidically couple the first fluid slot (151) to the second fluid slot (152).

The fluidic die (100) may also include a silicon-on-insulator (SOI) layer (160). The SOI layer (160) may be used in an SOI etching process during manufacturing to form the fluid slots (151, 152) and fluid channels (104) in the fluidic die (100). The SOI layer (160) may be made of, for example, silicon oxide. Further, in examples where a fluid feed hole substrate (118) is included, an additional SOI layer deposited between the fluid feed hole substrate (118) and the fluid channel layer (140) may be used to etch the fluid slots (151, 152) up to the SOI layer between the fluid feed hole substrate (118) and the fluid channel layer (140), and then removed using a wet etch process. The method of manufacturing the fluidic die (100) is described in more detail herein.

Figure 1B:
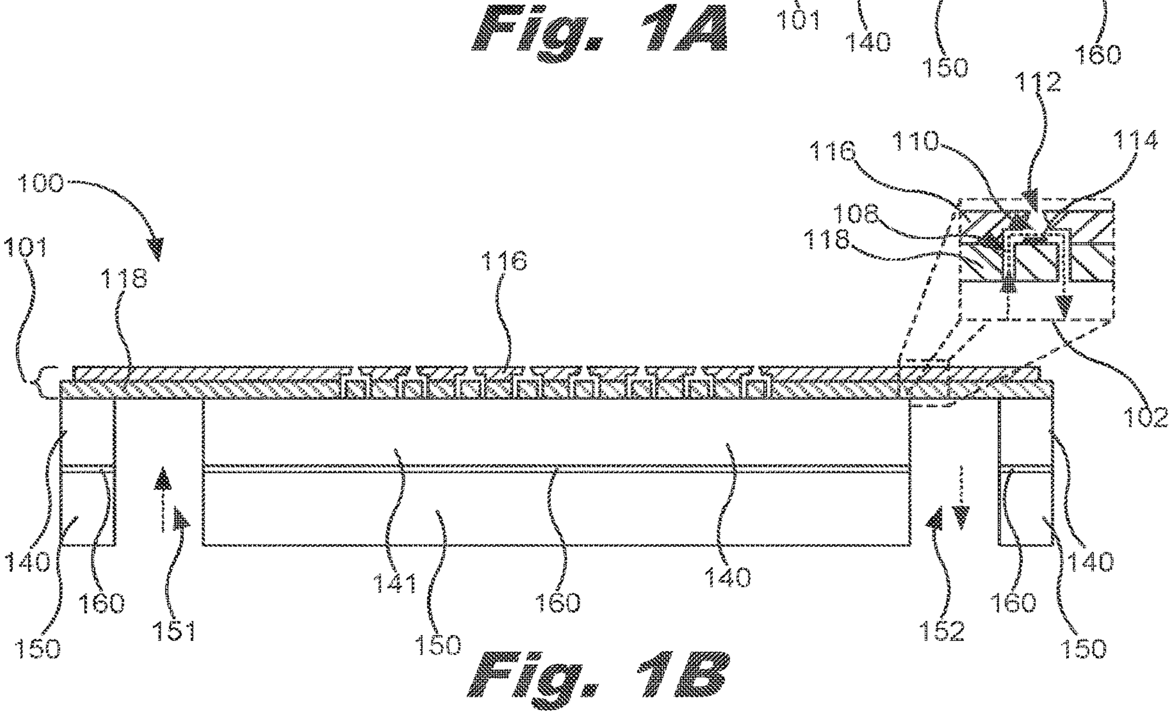
FIG. 1B is a cutaway view of the fluidic die of FIG. 1A along line A-A as depicted in FIG. 1A, according to an example of the principles described herein.
Figure 1C:
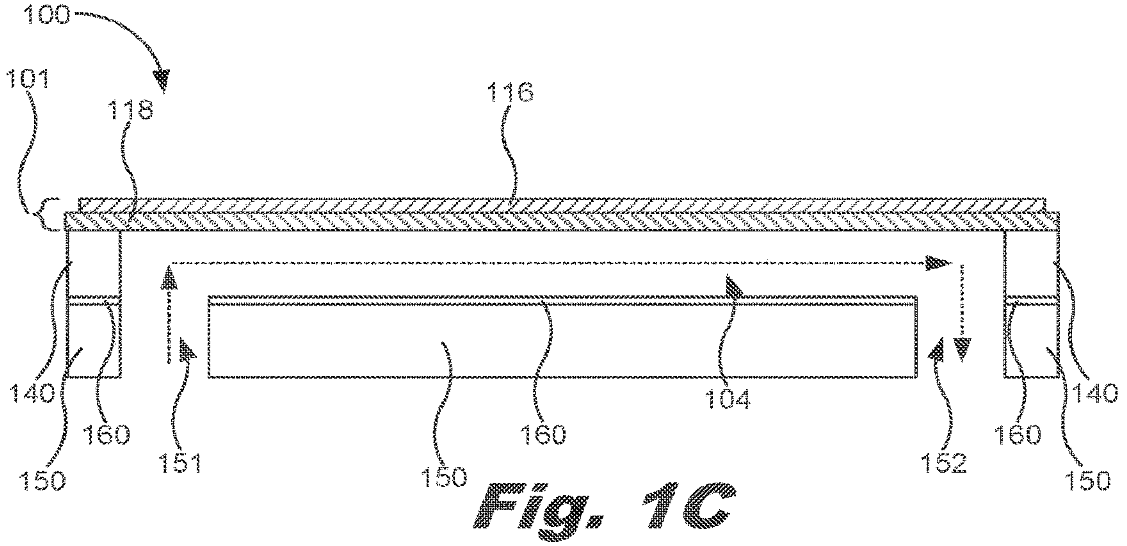
FIG. 1C is a cutaway view of the fluidic die of FIG. 1A along line B-B as depicted in FIG. 1A, according to an example of the principles described herein.

As depicted in FIGS. 1B and 1C include a depiction of one of a number of fluid ejection subassemblies (102) formed in the fluid ejection layer (101). To eject the fluid onto a substrate such as a printing medium, the fluidic die (100) includes an array of fluid ejection subassemblies (102). For simplicity in FIG. 1A, one fluid ejection subassembly (102), and, in particular, its nozzle aperture (122), has been indicated with a reference number in FIG. 1A. Moreover, it should be noted that the relative size of the fluid ejection subassemblies (102) and the fluidic die (100) are not to scale, with the fluid ejection subassemblies (102) being enlarged for purposes of illustration. The fluid ejection subassemblies (102) of the fluidic die (100) may be arranged in columns or arrays such that properly sequenced ejection of fluid from the fluid ejection subassemblies (102) causes characters, symbols, and/or other graphics or images to be printed on the print medium as the fluidic die (100) and print medium are moved relative to each other.

In one example, the fluid ejection subassemblies (102) in the array may be further grouped. For example, a first subset of fluid ejection subassemblies (102) of the array may pertain to one color of ink, or one type of fluid with a set of fluidic properties, while a second subset of fluid ejection subassemblies (102) of the array may pertain to another color of ink, or fluid with a different set of fluidic properties. The fluidic die (100) may be coupled to a controller that controls the fluidic die (100) in ejecting fluid from the fluid ejection subassemblies (102). For example, the controller defines a pattern of ejected fluid drops that form characters, symbols, and/or other graphics or images on the print medium. The pattern of ejected fluid drops is determined by the print job commands and/or command parameters received from a computing device.

To eject fluid, the fluid ejection subassembly (102) includes a number of components. For example, a fluid ejection subassembly (102) may include an ejection chamber (110) to hold an amount of fluid to be ejected, a nozzle aperture (112) through which an amount of the fluid is ejected, and a fluid ejection actuator (114), disposed within the ejection chamber (110), to eject the amount of fluid through the nozzle aperture (112). The ejection chamber (110) and nozzle aperture (112) may be defined in the fluid ejection layer (101) that may be deposited on top of a fluid feed hole substrate (118) of the fluid ejection layer (101) or that is disposed directly on top of the fluid channel layer (140) in examples that do not include a fluid feed hole substrate (118). In some examples, the nozzle substrate (116) may be formed of SU-8 or other material.

Turning to the fluid ejection actuators (114), the fluid ejection actuator (114) may include a firing resistor or other thermal device, a piezoelectric element, or other mechanism for ejecting fluid from the ejection chamber (110). For example, the fluid ejection actuator (114) may be a firing resistor. The firing resistor heats up in response to an applied voltage. As the firing resistor heats up, a portion of the fluid in the ejection chamber (110) vaporizes to form a cavitation bubble. This cavitation bubble pushes fluid out the nozzle aperture (112) and onto the print medium. As the vaporized fluid bubble pops, fluid is drawn into the ejection chamber (110) from a fluid feed hole (108), and the process repeats. In this example, the fluidic die (100) may be a thermal inkjet (TIJ) fluidic die (100).

In another example, the fluid ejection actuator (114) may be a piezoelectric device. As a voltage is applied, the piezoelectric device changes shape which generates a pressure pulse in the ejection chamber (110) and pushes the fluid out the nozzle aperture (112) and onto the print medium. In this example, the fluidic die (100) may be a piezoelectric inkjet (PIJ) fluidic die (100).

Figure 1D:
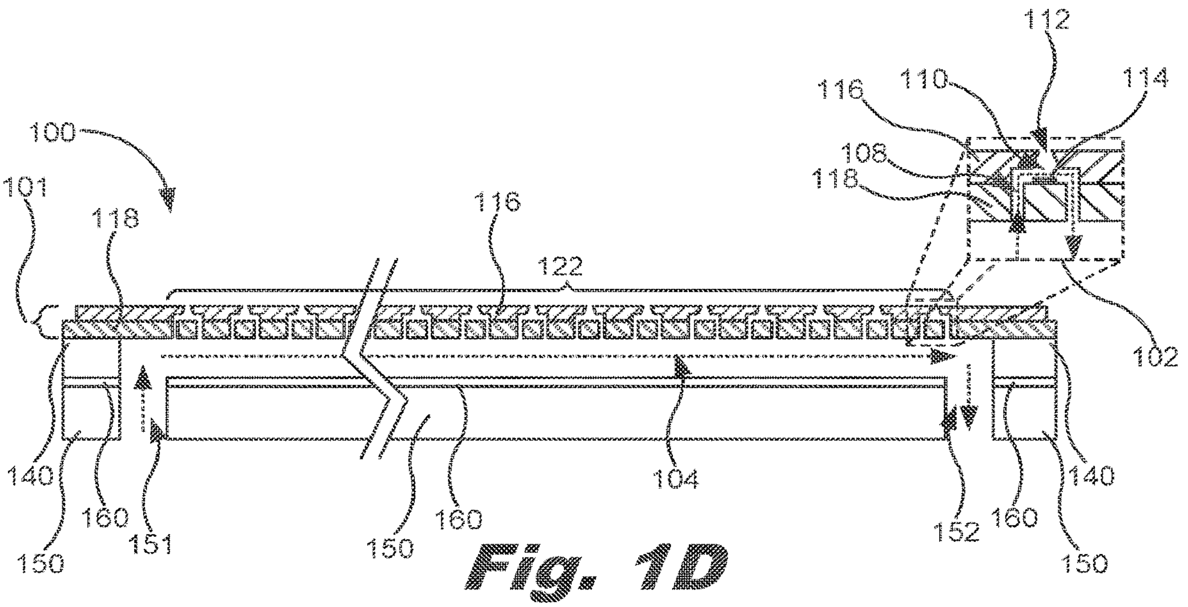
FIG. 1D is a cutaway view of the fluidic die of FIG. 1A along line C-C as depicted in FIG. 1A, according to an example of the principles described herein.
Figure 1E:
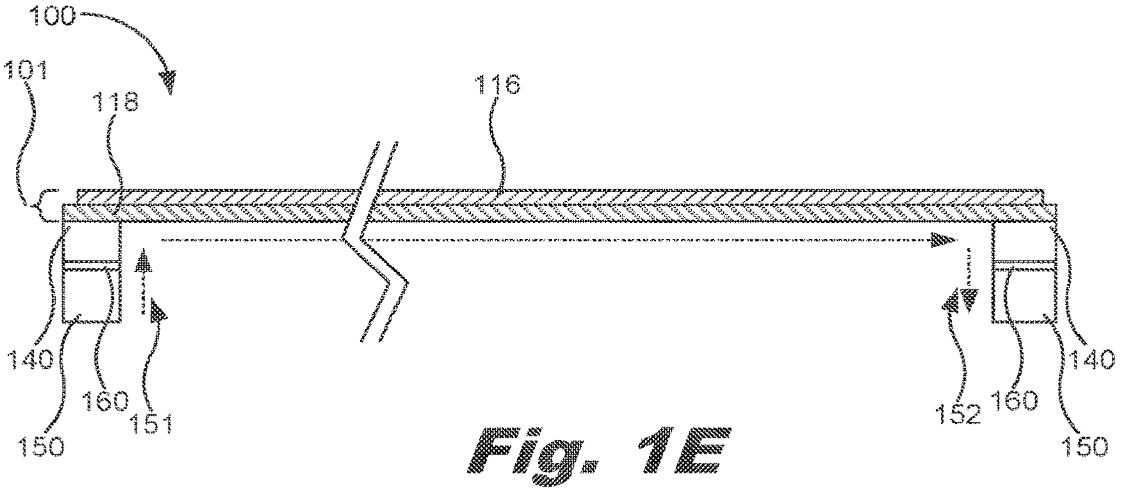
FIG. 1E is a cutaway view of the fluidic die of FIG. 1A along line D-D as depicted in FIG. 1A, according to an example of the principles described herein.

The fluidic die (100) also includes a number of fluid feed holes (108) that are formed in a fluid feed hole substrate (118). The fluid feed holes (108) deliver fluid to and from the corresponding ejection chamber (110). In some examples, the fluid feed holes (108) are formed in a perforated membrane of the fluid feed hole substrate (118). For example, the fluid feed hole substrate (118) may be formed of silicon, and the fluid feed holes (108) may be formed in a perforated silicon membrane that forms part of the fluid feed hole substrate (118). That is, the membrane may be perforated with holes which, when joined with the nozzle substrate (116), align with the ejection chamber (110) to form paths of ingress and egress of fluid during the ejection process. As depicted in FIGS. 1B and 1D, two fluid feed holes (108) may correspond to each ejection chamber (110) such that one fluid feed hole (108) of the pair is an inlet to the ejection chamber (110) and the other fluid feed hole (108) is an outlet from the ejection chamber (110) as indicated by the arrows depicted in the projected window of these figures. In some examples, the fluid feed hole (108) may be round holes, square holes with rounded corners, or other type of passage. In examples where a fluid feed hole substrate (118) is included, an additional SOI layer deposited between the fluid feed hole substrate (118) and the fluid channel layer (140) may be used to etch the fluid slots (151, 152) up to the SOI layer between the fluid feed hole substrate (118) and the fluid channel layer (140), and then removed using a wet etch process.

Further, in one example, the fluidic die (100) may not include a fluid feed hole substrate (118). In this example, the fluid ejection actuators (114) are disposed on the fluid channel layer (140), and the nozzle substrate (116) is disposed directly on top of the fluid channel layer (140). Further in this example, the ejection chambers (110) and nozzle apertures (112) are aligned with the fluid ejection actuators (114). Thus, in this example, the fluid does not flow through fluid feed holes (108) before arriving at the ejection chambers (110), but flows directly over the fluid ejection actuators (114) as it travels through the number of fluid channels (104). This example where the fluidic die (100) does not include a fluid feed hole substrate (118) is depicted in FIGS. 2 through 6D.

The fluidic die (100) may also include a number of fluid channels (104) defined in the fluid channel layer (140). The fluid channels (104) are defined within the fluid channel layer (140) along a width of the fluid ejection device. The fluid channels (104) may be formed to fluidically interface with the backside of the fluid feed hole substrate (118) or the directly with the fluid ejection chambers (110), and deliver fluid to and from the fluid feed holes (108) defined within the fluid feed hole substrate (118) or the fluid ejection chambers (110), respectively. In one example, each fluid channel (104)

is fluidically coupled to a number of fluid feed holes (108) of an array of fluid feed holes (108) or an array of fluid ejection chambers (110). That is, fluid enters a fluid channels (104), passes through the fluid channels (104), passes to respective fluid feed holes (108) or directly through the fluid ejection chambers (110), and then exits the fluid feed holes (108) or fluid ejection chambers (110), and into the fluid channel (104) to be mixed with other fluid in the associated fluidic delivery system.

In some examples, the fluid path through the fluid channels (104) is perpendicular to the flow through the fluid feed holes (108) in examples including the fluid feed hole substrate (118). That is, fluid enters the first fluid slot (151), passes through the fluid channel (104), passes to respective fluid feed holes (108), and then exits the second fluid slot (152) to be mixed with other fluid in the associated fluidic delivery system. In examples where the fluid feed hole substrate (118) is not included, the fluid enters the first fluid slot (151), passes through the fluid channel (104), passes to respective fluid ejection chambers (110), exits the fluid ejection chambers (110), and then exits the second fluid slot (152) to be mixed with other fluid in the associated fluidic delivery system.

The fluid channels (104) are defined by any number of surfaces. For example, one surface of a fluid channel (104) may be defined by the membrane portion of the fluid feed hole substrate (118) in which the fluid feed holes (108) are defined in examples including the fluid feed hole substrate (118). In another example, one surface of the fluid channels (104) may be defined by the nozzle substrate (116) in which the ejection chambers (110) and nozzle apertures (112) are defined in examples that do not include the fluid feed hole substrate (118). Another surface may be at least partially defined by the fluid channel layer (140).

The individual fluid channels (104) of the array may correspond to fluid feed holes (108) and/or corresponding ejection chambers (110) of a particular row. For example, as depicted in FIG. 1A, the array of fluid ejection subassemblies (102) may be arranged in rows, and each fluid channel (104) may align with a row, such that fluid ejection subassemblies (102) in a row may share the same fluid channel (104). While FIG. 1A depicts the rows of fluid ejection subassemblies (102) in a straight, diagonal line, the rows of fluid ejection subassemblies (102) may be angled, curved, chevron-shaped, staggered, or otherwise oriented or arranged. Accordingly, in these examples, the fluid channels (104) may be similarly, angled, curved, chevron-shaped, or otherwise oriented or arranged to align with the arrangement of the fluid ejection subassemblies (102). In another example, the fluid feed holes (108) of a particular row may correspond to multiple fluid channels (104). That is, the rows may be straight, but the fluid channels (104) may be angled. While specific reference is made to a fluid channel (104) per two rows of fluid ejection subassemblies (102), more or fewer rows of fluid ejection subassemblies (102) may correspond to a single fluid channel (104).

Further, as depicted in FIGS. 1B, 1C, and 1D, a plurality of fluid channels (104) may be separated by ribs or posts (141). The ribs or posts (141) may serve to support the layers above the fluid channel layer (140) including the nozzle substrate (116) and fluid feed hole substrate (118) (in examples including the fluid feed hole substrate (118) of the fluid ejection layer (101). In one example, the ribs or posts (141) extend between adjacent fluid channels (104) for the length of the fluid channels (104). In another example, the ribs or posts (141) may be intermittent along the length or width of the fluid channels (104). Further, the ribs or posts may include continuous or discontinuous structures along the length of these structures formed between the fluid channels (104). In the case of discontinuous structures such as posts formed, the fluid may be free to move in the fluid channel layer (140) around the posts.

In some examples, the fluid channels (104) deliver fluid to rows of different subsets of the array of fluid feed holes (108). For example, as depicted in FIGS. 1A and 1C, a plurality of fluid channels (104) may deliver fluid to a row of fluid ejection subassemblies (102) in a first subset and a row of fluid ejection subassemblies (102) in a second subset. In this example, one type of fluid, for example, one ink of a first color, may be provided to a first subset via its corresponding fluid channels (104) and an ink of a second color may be provided to a second subset via its corresponding fluid channels (104). In a specific example, a monochrome fluidic die (100) may implement at least one fluid channel (104) across multiple subsets of fluid ejection subassemblies (102). Such fluidic dies (100) may be used in multi-color printing fluid cartridges.

These fluid channels (104) promote increased fluid flow through the fluidic die (100). For example, without the fluid channels (104), fluid passing on a backside of the fluidic die (100) may not pass close enough to the fluid feed holes (108) and/or the ejection chambers (110) to sufficiently mix with fluid passing through the fluid ejection subassemblies (102). However, the fluid channels (104) draw fluid closer to the fluid ejection subassemblies (102) thus facilitating greater fluid mixing. The increased fluid flow also improves nozzle health as used fluid is removed from the fluid ejection subassemblies (102), which used fluid, if recycled throughout the fluid ejection subassembly (102), can damage the fluid ejection subassembly (102).

Further, as cooler fluid is moved through the fluid channels (104), into the fluid feed holes (108) and/or the ejection chambers (110), and back into the fluid channels (104), the cool fluid causes the fluid ejection actuator (114) to cool by pulling the heat from the fluid ejection actuator (114) through heat transfer. Thus, the fluid to be ejected by the fluid ejection subassemblies (102) serves also as a coolant to cool the fluid ejection actuators (114) within the fluidic die (100) and, in turn, cool the fluidic die (100) as a whole.

However, as the fluid passes over a first fluid ejection actuator (114) along a length or width of the fluidic die (100), the fluid is relatively hotter than when it was introduced to the first fluid ejection actuator (114). The fluid gets hotter and hotter as it is passed over consecutive first fluid ejection actuators (114). This causes the coolant effect of the fluid to become less and less effective as it moves down the rows of fluid ejection actuators (114) from one end of the fluidic die (100) to the other, and causes a heat gradient to be created along the length of the fluidic die (100) with a first end of the fluidic die (100) where the fluid is first introduced to the fluid channels (104) being relatively cooler than a second end of the fluidic die (100) where the fluid leaves the fluid channels (104) and with a first side of the fluidic die (100) where the fluid is first introduced being relatively cooler than the second side. In order to reduce or eliminate this heat gradient in the fluidic die (100), some examples described herein including those depicted in FIGS. 2 through 5 may dump relatively hotter fluid that has interacted with one set of actuators including a single fluid ejection actuator (114) and/or a single pump actuator used to move the fluid past the fluid ejection actuator (114) into a fluid channel (104) that is used to move the fluid out of the fluidic die (100) without interacting with another set of actuators or in a manner in which relatively hotter fluid interacts less with the set of actuators. The examples of FIG. 4 especially ensures that the fluid never flows through two sets of actuators, while other examples described herein reduce the probability of the fluid flowing over two or more sets of actuators.

Given that the fluid slots (151, 152) run the length of the fluidic die (100) and the fluid channels (104) within the fluid channel layer (140) run across the width of the fluidic die (100), the fluid slots (151, 152) serve to provide fresh, cool fluid to the fluid channels (104) and the fluid ejection layer (101) such that any temperature gradient that may otherwise exist along the length or width of the fluidic die (100) may be reduced or eliminated. In one example, a number of external pumps may be fluidically coupled to the fluid slots (151, 152). The external pumps cause fluid to flow into and out of the fluid slots (151, 152) as well as into and out of the fluidically coupled fluid channels (104). With cool fluid constantly flowing into the fluid channels (104), and the fluid feed holes (108) and/or ejection chambers (110) of the fluid ejection subassemblies (102), fresh cool fluid is made available to the fluid ejection layer (101). Further, by pulling fluid heated by the fluid ejection actuators (114) and non-ejection actuators of the fluid ejection subassemblies (102) out from the fluid ejection layer (101) and the fluid channels (104), heat is continually removed from the system, and any heat gradients are not formed along the fluidic die (100).

In one example, while the figures depict straight fluid channel (104), in some examples, the sidewalls may include uneven or non-linear sidewalls such as zig-zag sidewalls. Further posts, or other structures may be included to create turbulent flow in the microchannel and encourage the coupling of recirculation of fluid through the fluid feed holes (108) and/or fluid ejection chambers (110) to recirculation of fluid through the fluid channels (104) and fluid slots (151, 152).

In one example, a number of internal pumps may be used to move the fluid through the recirculation channels including the fluid feed hole (108) and/or the ejection chambers (110) as well as the relatively larger recirculation channels such as the fluid channels (104) and fluid slots (151, 152). These internal pumps may take the form of a recirculation pump, which is an example of a non-ejecting actuator that moves fluid through passages, channels, and other pathways within the fluidic die (100). The recirculation pumps may be any resistive device, piezoelectric device, or other microfluidic pump device.

Figure 2:
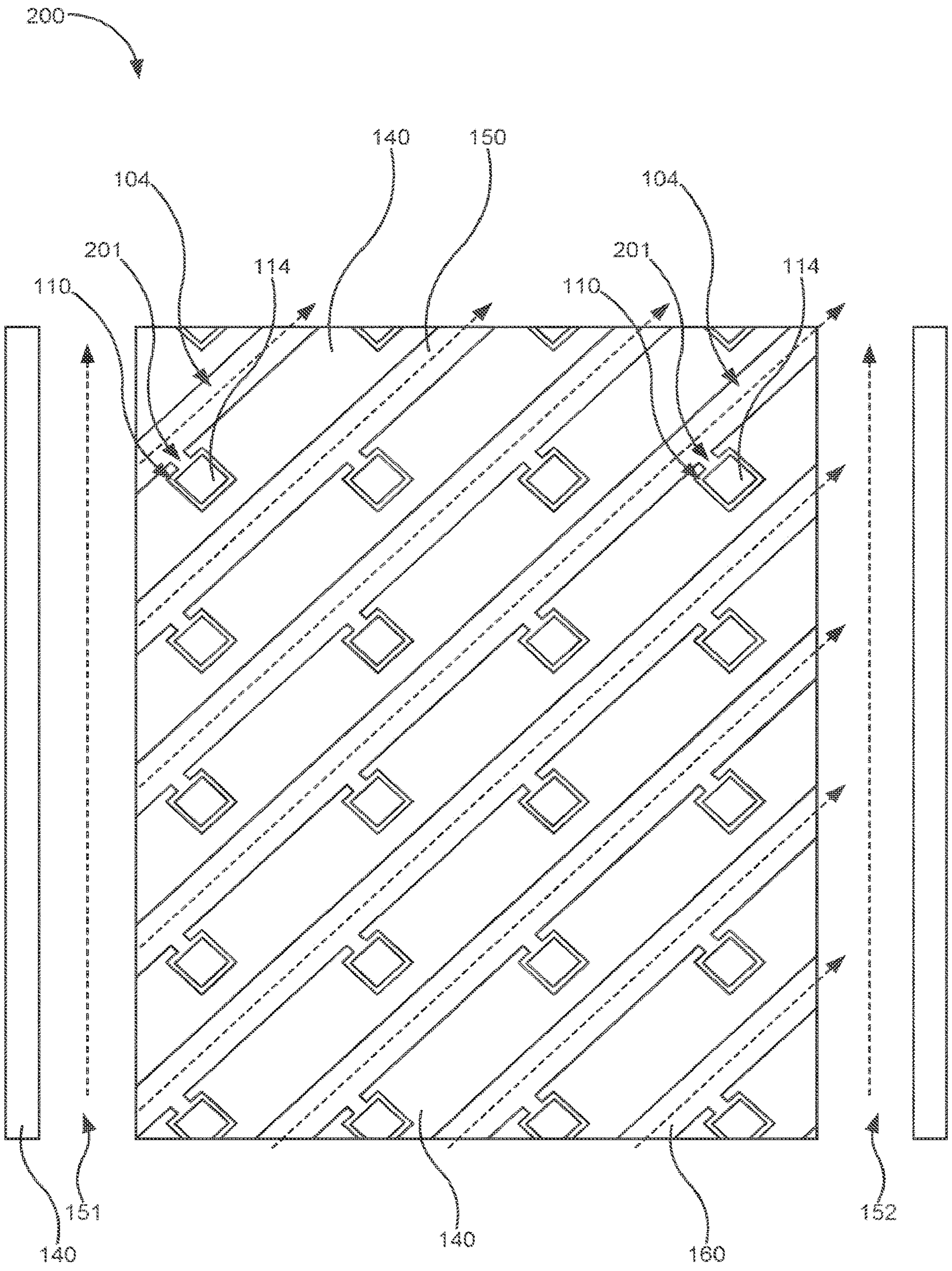
FIG. 2 is cutaway top view of a section of the fluidic die of FIG. 1A, according to an example of the principles described herein.

FIG. 2 is cutaway top view of a section of the fluidic die (200) of FIG. 1A, according to an example of the principles described herein. The fluid ejection layer (101) of the fluidic die (200) has been removed to depict the fluid channel layer (140) and the SOI layer (160) covering the slot layer (150). The example of FIG. 2 may include a number of fluid ejection chambers (110) arranged diagonally across the width of the fluidic die (200). A fluid ejection actuator (114) is disposed within each of the fluid ejection chambers (110), and an orifice (201) fluidically couples the fluid ejection chambers (110) to the fluid channels (104). The dashed arrows depicted in FIG. 2 indicate the flow of fluid through the fluid slots (151, 152) and fluid channels (104). As depicted, the fluid flows generally from the bottom left of the fluidic die (200) to the top right as depicted in FIG. 2 through the fluid slots (151, 152) and fluid channels (104). This general convention is also depicted in connection with FIGS. 3 and 4 as well, and the dashed arrows depicted in FIGS. 2 through 5 indicate the flow of fluid through the fluidic dies of these examples.

As the fluid in FIG. 2 flows through the fluid slots (151, 152) and fluid channels (104), and into the fluid ejection chambers (110). In this example, the heat created by the activation of the fluid ejection actuators (114) may be significantly reduced or eliminated due to the movement of fluid from the fluid channels (104) and into the fluid ejection chambers (110) where the fluid is ejected from the fluidic die (200). In this manner, relatively hotter fluid made hot through the activation of the fluid ejection actuators (114) is largely expelled from the fluidic die (200) and not recirculated back into the fluid channels (104). Even if some fluid is expelled back into the fluid channels (104), this amount of relatively hotter fluid within the fluid channels (104) may be negligible or otherwise non-effective to significantly heat the fluidic die (200). Further, as described herein, the example of FIG. 2 may or may not include both a nozzle substrate (116) and a fluid feed hole substrate (118) of the fluid ejection layer (101), or may include just a nozzle substrate (116).

Figure 3:
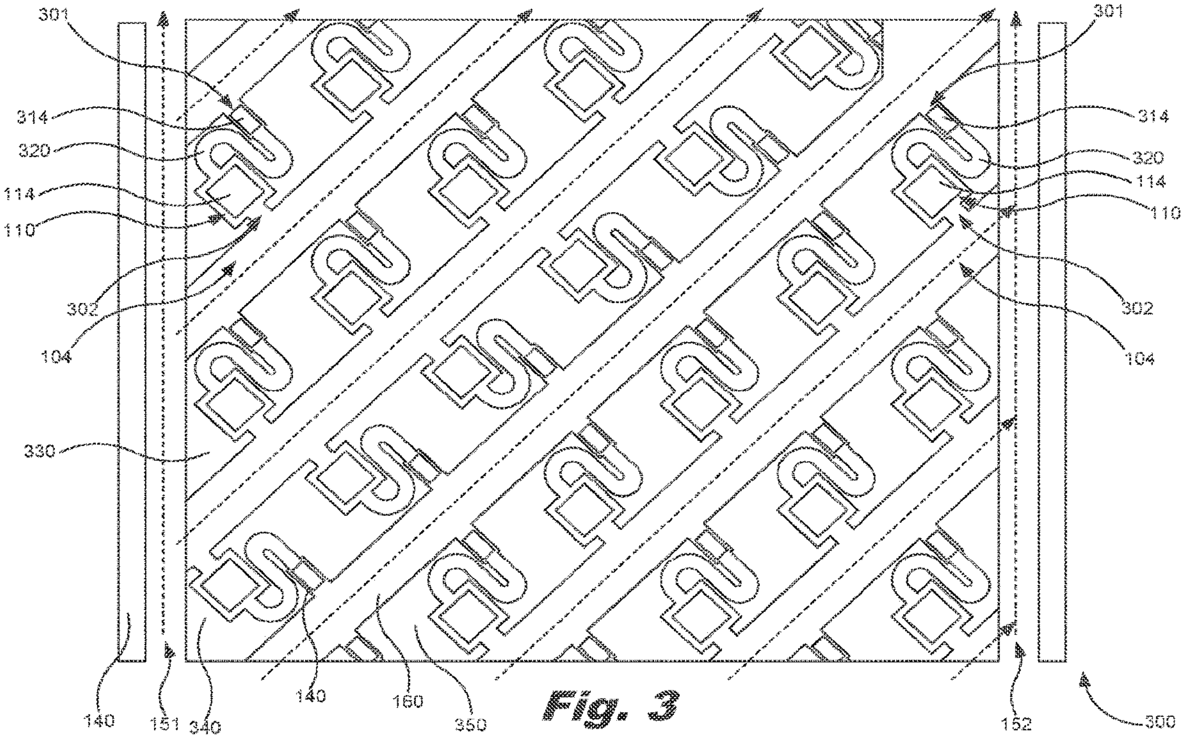
FIG. 3 is cutaway top view of a section of the fluidic die of FIG. 1A, according to another example of the principles described herein.

FIG. 3 is cutaway top view of a section of the fluidic die (300) of FIG. 1A, according to another example of the principles described herein. The fluidic die (300) of FIG. 3 may include an array of fluid ejection actuators (114) disposed in an array of fluid ejection chambers (110). A non-ejecting actuator (314) may be fluidically coupled to each fluid ejection chambers (110) via an inter-channel passage (320). The non-ejecting actuator (314) may be, for example, a microfluidic pump. The inter-channel passage (320) may be fluidically coupled to two adjacent fluid channels (104) via a first orifice (301) located at a first end of the inter-channel passage (320) fluidically coupled to a first fluid channel (104), and a second orifice (302) located at a second end of the inter-channel passage (320) fluidically coupled to an adjacent second fluid channel (104). Thus, in the example of FIG. 3, the fluid may flow from a first fluid channel (104), into the first orifice (301), past the non-ejecting actuator (314), through the inter-channel passage (320), and into the fluid ejection chamber (110). Once in the fluid ejection chamber (110) a portion of the fluid within the fluid ejection chamber (110) may be ejected through the fluid ejection layer (101) (not shown) using the fluid ejection actuators (114), and a remaining portion of the fluid may be moved out of the fluid ejection chamber (110) through the second orifice (302) and into the adjacent second fluid channel (104). The non-ejecting actuator (314) may be any actuator that moves the fluid through the inter-channel passage (320) and fluid ejection chamber (110) from the first fluid channel (104) into the adjacent second fluid channel (104). In another example, the non-ejecting actuator (314) may be any actuator that moves the fluid in the opposite direction through the fluid ejection chamber (110) and inter-channel passage (320) from the second fluid channel (104) into the adjacent first fluid channel (104). Further, in still another example, the array of non-ejecting actuator (314) associated with the array of fluid ejection chambers (110) and fluid ejection actuators (114) may cause the fluid to move in opposite directions.

In still another example, the orientation and layout of the non-ejecting actuators (314), inter-channel passages (320), fluid ejection chambers (110), fluid ejection actuators (114), first orifices (301), and second orifices (302) within a diagonal row (330, 340, 350) may be opposite relative to an adjacent diagonal row (330, 340, 350). This is depicted in FIG. 3 where diagonal rows (330, 340, 350) have opposite orientations and layouts. In this example, any fluid not ejected from the fluid ejection chambers (110) within, for example, diagonal rows 340 and 350 may be dumped into a common fluid channel (104) between those two diagonal rows (340, 350). In this manner, relatively hotter fluid made hot through its coming into contact with the non-ejecting actuator (314) and the fluid ejection actuators (114) may be dumped into the fluid channels (104) between diagonal rows 340 and 350 without the risk of that relatively hotter fluid being drawn into another diagonal row (330, 340, 350) of non-ejecting actuators (314), inter-channel passages (320), fluid ejection chambers (110), fluid ejection actuators (114), first orifices (301), and second orifices (302). The orientation of the diagonal rows (330, 340, 350) of FIG. 3 may be uniform throughout the entirety of the fluidic die (300) such that all diagonal rows have elements that are facing in opposite directions as depicted between diagonal rows (330, 340, 350). The depiction of non-opposite facing diagonal rows in FIG. 3 is used to depict alternative examples.

As a consequence of the opposite orientation of the diagonal rows (330, 340, 350), cool fluid from the first fluid slot (151) enters a fluid channel (104) such as the fluid channel (104) between diagonal rows 340 and 350, moves through the fluid ejection chambers (110) of those diagonal rows (340, 350) into fluid channels (104) on opposite sides of the diagonal rows (340, 350) away from the fluid channel (104) between diagonal rows 340 and 350. Fluid from the first fluid slot (151) that flows into the fluid channels (104) located on opposite sides of the diagonal rows (340, 350) will then flush out the relatively hotter fluid dispensed from the fluid ejection chambers (110) of those diagonal rows (340, 350), to the second fluid slot (152), and out of the fluidic die (300). Thus, in this example, the fluid may not be heated by more than one set of non-ejecting actuators (314) and fluid ejection actuators (114) before leaving the fluidic die (300).

In still another example, the fluid may be moved through the non-ejecting actuators (314), inter-channel passages (320), fluid ejection chambers (110), fluid ejection actuators (114), first orifices (301), and second orifices (302) using a combination of the direction of actuation of the non-ejecting actuators (314) and the orientation of the elements within diagonal rows (330, 340, 350). In this example, the arrangement and layout of the diagonal rows (330, 340, 350) and their elements, and the direction of actuation of the non-ejecting actuators (314) may be used in any combination to cause relatively hotter fluid from being drawn into consecutive fluid ejection chambers (110).

Figure 4:
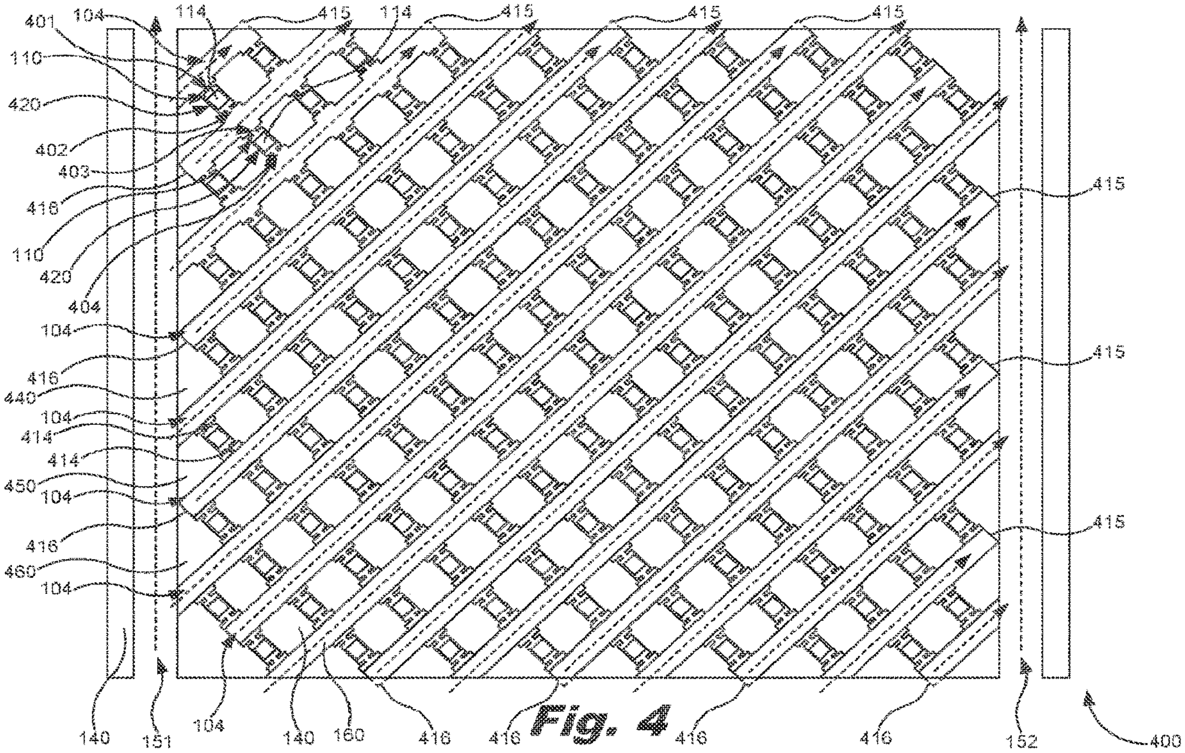
FIG. 4 is cutaway top view of a section of the fluidic die of FIG. 1A, according to still another example of the principles described herein.

FIG. 4 is cutaway top view of a section of the fluidic die (400) of FIG. 1A, according to still another example of the principles described herein. The fluidic die (400) of FIG. 4 may include an array of fluid ejection actuators (114) disposed in an array of fluid ejection chambers (110). In one example, a number of non-ejecting actuators (414) may be fluidically coupled to each fluid ejection chambers (110) via an inter-channel passage (420). However, for simplicity and to describe the function of the example of FIG. 4, these non-ejecting actuators (414) are not described in detail in connection with FIG. 4. Any non-ejecting actuators (414) included in the example of FIG. 4 may be included with any of the fluid ejection actuators (114) and fluid ejection chambers (110), and may be located at first (401, 404) and second (402, 403) orifices of an inter-channel passage (420) as depicted in a single instance of FIG. 4. When present, the non-ejecting actuators (414) may be any actuator that moves the fluid through the inter-channel passage (420) and fluid ejection chamber (110) from the first fluid channel (104) into the adjacent second fluid channel (104). In another example, the non-ejecting actuator (414) may be any actuator that moves the fluid in the opposite direction through the fluid ejection chamber (110) and inter-channel passage (420) from the second fluid channel (104) into the adjacent first fluid channel (104). Further, in still another example, the array of non-ejecting actuator (414) associated with the array of fluid ejection chambers (110) and fluid ejection actuators (114) may cause the fluid to move in opposite directions.

The inter-channel passage (420) may be fluidically coupled to two adjacent fluid channels (104) via a first orifice (401) located at a first end of the inter-channel passage (420) fluidically coupled to a first fluid channel (104), and a second orifice (402) located at a second end of the inter-channel passage (420) fluidically coupled to an adjacent second fluid channel (104). Thus, in the example of FIG. 4, the fluid may flow from a first fluid channel (104), into the first orifice (401), through the inter-channel passage (420), and into the fluid ejection chamber (110). Once in the fluid ejection chamber (110), a portion of the fluid within the fluid ejection chamber (110) may be ejected through the fluid ejection layer (101) (not shown) using the fluid ejection actuators (114), and a remaining portion of the fluid may be moved out of the fluid ejection chamber (110) through the second orifice (402) and into the adjacent second fluid channel (104).

In the example of FIG. 4, a number of first diversion walls (415) and a number of second diversion walls (416). The Diversion walls (415, 416) serve to cause the fluid that flows into the fluid channels (104) to divert through a number of inter-channel passages (420) and into a neighboring fluid channel (104). The top left fluid channel (104) depicted in FIG. 4 is fluidically coupled to the first fluid slot (151), and includes a first diversion wall (415). The first diversion wall (415) stops the fluid from moving into the second fluid slot (512). The first diversion wall (415) is depicted using dashed lines to indicate that the first diversion wall (415) ends that particular fluid channel (104) from being fluidically coupled to the second fluid slot (152). Ends of the fluid channels (104) terminating in at a first diversion wall (415) are depicted at the right of the fluidic die (400) as well and are depicted as terminating before the second fluid slot (152). In this manner, fluid channels including the first diversion wall (415) are fluidically coupled to the first fluid slot (151), and are not fluidically coupled to the second fluid slot (152). Thus, any fluid entering fluid channels (104) including the first diversion walls (415) enter via the first fluid slot (151) and exit these fluid channels (104) via a number of the inter-channel passages (420).

In contrast, the second diversion walls (416) are fluidically coupled to the second fluid slot (152), and are not fluidically coupled to the first fluid slot (151). An example of a fluid channel (104) including a second diversion walls (416) is depicted in the top left of FIG. 4 where the second fluid channel (104) from the top left includes the second diversion walls (416). Thus, any fluid entering fluid channels (104) including the second diversion walls (416) enter via a number of the inter-channel passages (420), an exit these fluid channels (104) via the second fluid slot (152).

With this understanding, fluid may enter a fluid channel (104) including the first diversion walls (415), and is diverted into the first orifices (401, 404), through the inter-channel passages (420), across the fluid ejection actuators (114), out the second orifices (402, 403), into adjacent fluid channels (104) including the second diversion walls (416), and into the second fluid slot (152). As a consequence of the inclusion of the first diversion walls (415) and the second diversion walls (416), cool fluid from the first fluid slot (151) enters a fluid channel (104) such as the fluid channel (104)

between, for example, diagonal rows 440 and 450, moves through the fluid ejection chambers (110) of the diagonal rows (440, 450) into fluid channels (104) on opposite sides of the diagonal rows (440, 450) away from the fluid channel (104) between diagonal rows 440 and 450. In this manner, a fluid channel with a second diversion wall (416) acts as a dump for relatively hotter fluid that has passed through the inter-channel passages (420) from those fluid channels that include first diversion walls (415), and the fluid may not be heated by more than one fluid ejection actuator (114) before leaving the fluidic die (300).

In one example, the diversion walls (415, 416) may be partial walls or perforated walls to allow for some fluid to exit the diversion walls (415, 416) and empty into the fluid slots (151, 152). In this example, some of the fluid may pass through the perforated diversion walls (415, 416) such that the diversion walls (415, 416) act as a fluid flow limiter.

Figure 5:
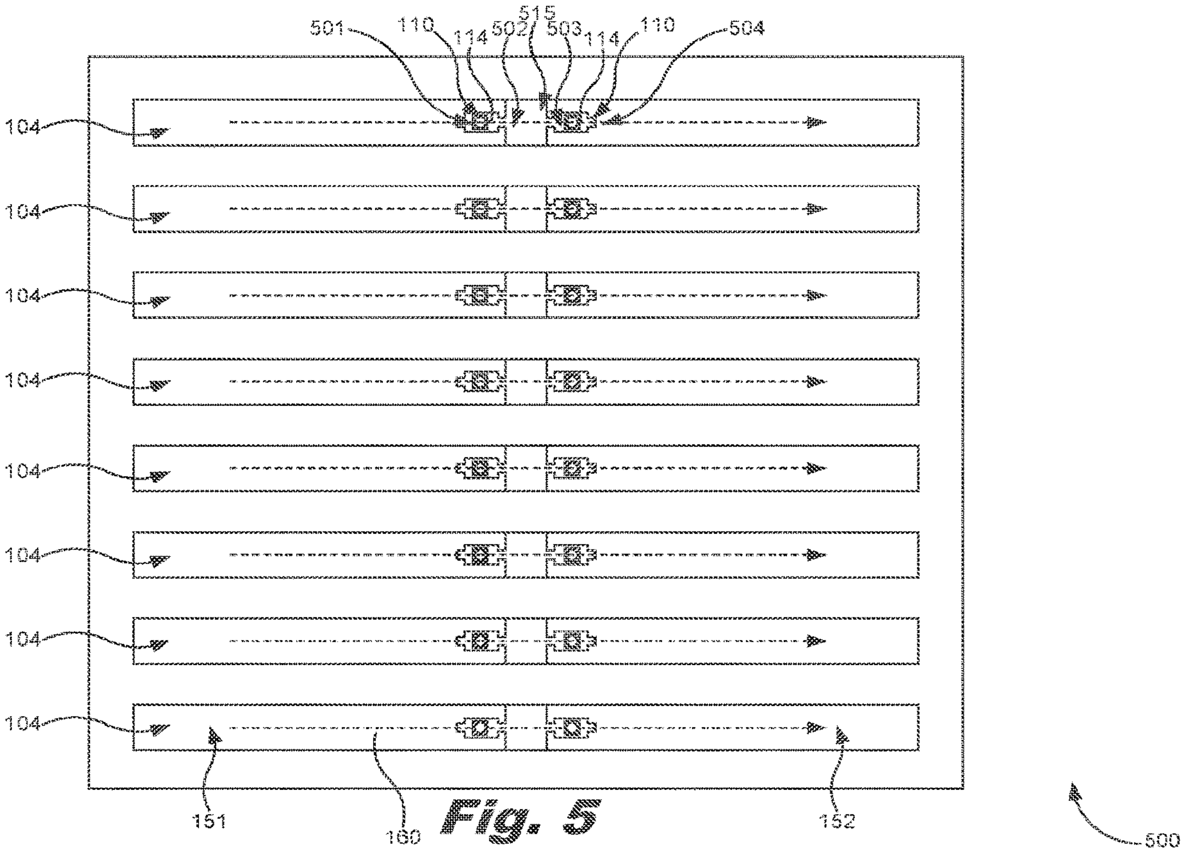
FIG. 5 is cutaway top view of a section of the fluidic die of FIG. 1A, according to yet another example of the principles described herein.

In the examples of FIG. 4, the flow of fluid from the first fluid slot (151) to the second fluid slot (152) may be achieved through application of a pressure differential between the two fluid slots (151, 152). In another example, the flow of fluid may be assisted through the use of the non-ejecting actuators (414) described herein in connection with FIG. 5 is cutaway top view of a section of the fluidic die (500) of FIG. 1A, according to yet another example of the principles described herein. The example of FIG. 5 includes a number of fluid channels (104) with each fluid channel (104) including a plurality of fluid ejection actuators (114) disposed in a plurality of fluid ejection chambers (110) where the fluid ejection chambers (110) are fluidically coupled in series between the first fluid slot (151) and the second fluid slot (152). In one example, one fluid ejection chamber (110) and its associated fluid ejection actuator (114) may be included within a single fluid channel (104).

The fluid channels (104) of FIG. 5 are formed over the fluid slots (151, 152) and the SOI layer (160) covering the slot layer (150). In the example of FIG. 5, a pressure differential may be created between the first fluid slot (151) and the second fluid slot (152) to move fluid through the fluid ejection chambers (110). Further, an intermediate chamber (515) may be formed between the fluid ejection chambers (110). The fluid may enter and exit a number of orifices (501, 502, 503, 504) that fluidically couples the fluid ejection chambers (110) to the fluid channels (104) and the intermediate chamber (515). The orifices (501, 502, 503, 504) may be fluidically coupled to the fluid channels (104) in the fluid channel layer (140) and at least one fluid slot (151, 152) in the fluid slot layer (150).

Although the fluid channels (104) in FIG. 5 are depicted as being oriented in a perpendicular manner relative to an orientation of the fluid slots (151, 152), the fluid channels (104) may be angled relative to the fluid slots (151, 152) as depicted in, for example, FIGS. 2 through 4. Likewise, although the fluid channels (104) in FIGS. 2 through 4 are depicted as being oriented in a non-perpendicular manner relative to an orientation of the fluid slots (151, 152), the fluid channels (104) may be oriented in a perpendicular manner relative to the fluid slots (151, 152) as depicted in, for example, FIG. 5. Orienting the fluid channels (104) and, correspondingly, the fluid ejection chambers (110) at a non-perpendicular angle relative to an orientation of the fluid slots (151, 152) allows for a higher density of the fluid ejection chambers (110) and the fluid ejection actuators (114) along a width and length of the fluidic die (100, 200, 300, 400, 500, collectively referred to herein as 100). The density of the fluid ejection chambers (110) and fluid ejection actuators (114) may be referred to as the nozzle pitch.

Figure 6A:
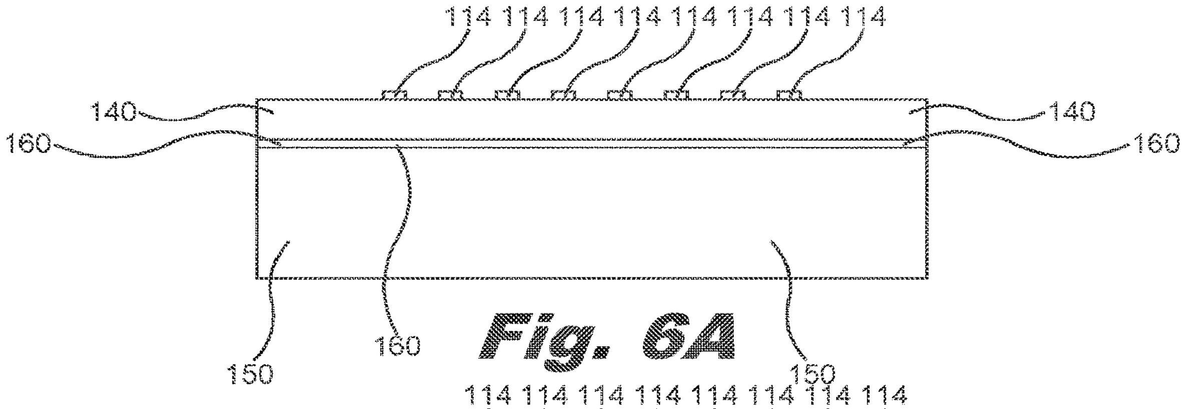
FIGS. 6A through 6D depict a side view of a fluidic die during stages of manufacture, according to an example of the principles described herein.

FIGS. 6A through 6D depict a side view of fluidic die (100), during stages of manufacture, according to an example of the principles described herein. In FIG. 6A, a number of fluid ejection actuators (114) and non-ejecting actuators (314, 414) are deposited or placed on the top of the channel layer (140) in an array that matches the arrays of the fluid ejection actuators (114) and non-ejecting actuators (314, 414) depicted in FIGS. 2 through 5 or in arrays contemplated thereby. The channel layer (140) is separated from the fluid slot layer (150) by a SOI layer (160). The SOI layer (160) serves as an etch stop to allow for the etching of the silicon channel layer (140) and fluid slot layer (150) to the SOI layer (160) depth.

The fluid ejection actuators (114) and non-ejecting actuators (314, 414) are arranged to allow for fluid channels (104) to be etched into the channel layer (140). Thus, in FIG. 6B, the channel layer (140) may be patterned with a photomask to allow for the etching of the fluid channels (104) in the desired or intended locations. In one example, the etching process may include a plasma dry etch process. The etching process allows for the etching of the channel layer (140) up to the SOI layer (160). In this manner, because the SOI layer (160) is not etchable, the SOI layer (160) assists in the etching process by providing a stopping point for the etching.

Figure 6B:
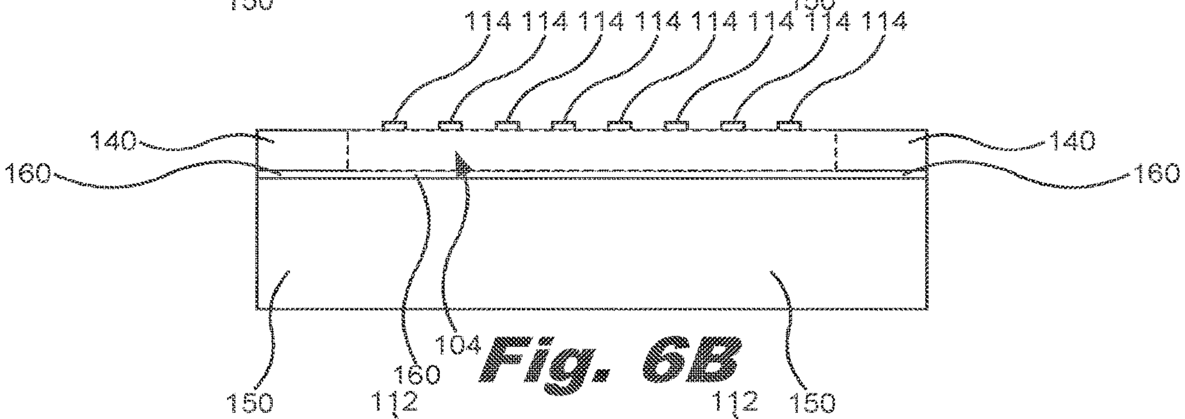
Figure 6C:
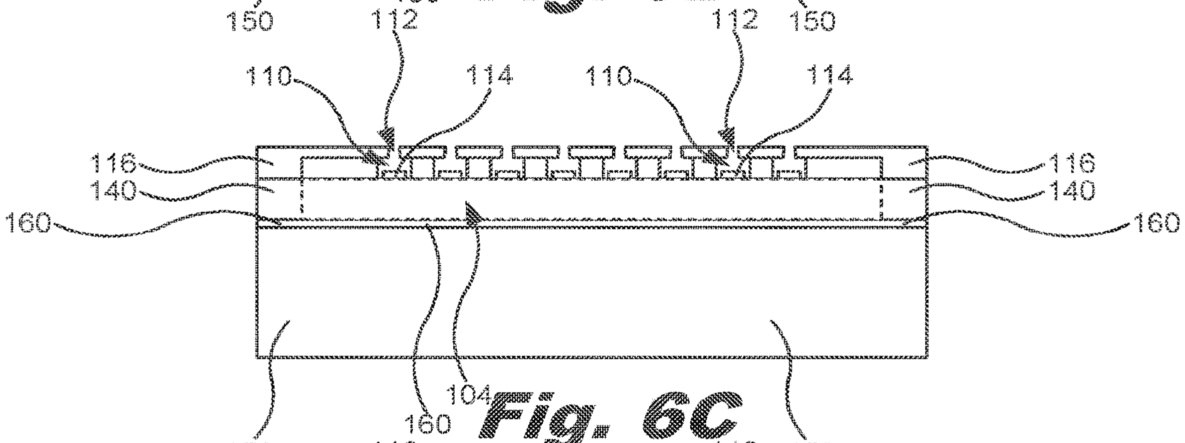
Figure 6D:
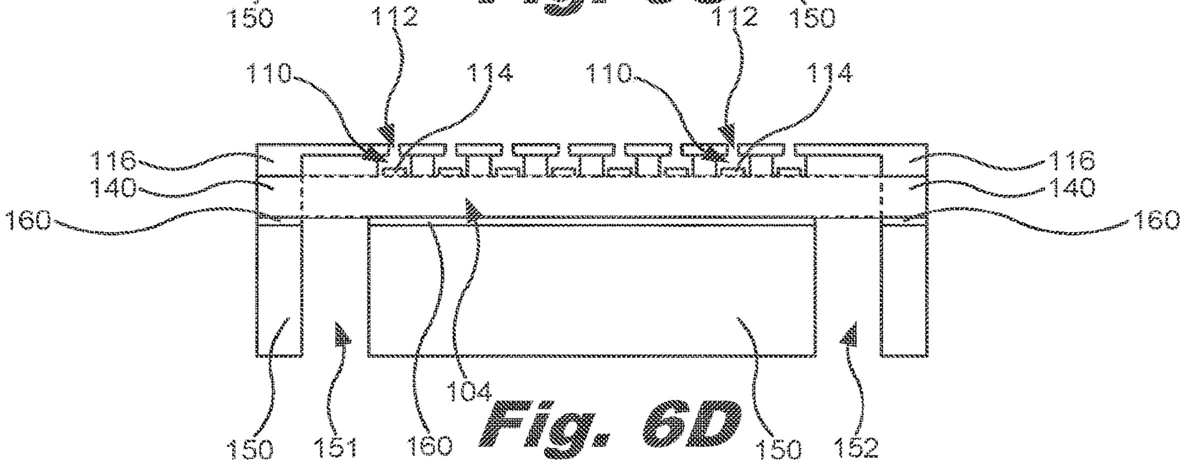

At FIG. 6C, a wax filler is placed into the fluid channels (104) formed in the fluid channel layer (140) at FIG. 6B in order to planarize the surface of the fluid channel layer (140) to the level of the top-most part of the fluid channel layer (140). The fluid ejection layer (101) is then formed on top of the fluid channel layer (140) and wax filler using a number of SU-8 layer processing to form the fluid ejection layer (101). As described herein, in one example, the fluidic die (100) may not include a fluid feed hole substrate (118) in the fluid ejection layer (101) along with the nozzle substrate (116). In this example, the fluid ejection actuators (114) are disposed on the fluid channel layer (140), and the nozzle substrate (116) is disposed directly on top of the fluid channel layer (140) as depicted in FIGS. 6A through 6D. In another example, the SU-8 fluid ejection layer (101) may be formed to include the fluid feed hole substrate (118). The formation of the SU-8 fluid ejection layer (101) may include deposition of a primer layer, formation of the fluid ejection chambers (110) and nozzle apertures (112), development of the SU-8material, lamination processes, or combinations thereof.

The backside of the fluidic die (100) may then be etched to form the fluid slots (151, 152). In one example, the etching process used to form the fluid slots (151, 152) may include etching up to the SOI layer (160). A wet etch process may then be used to remove the silicon oxide of the SOI layer (160) to allow the fluid slots (151, 152) to fluidically couple with the fluid channels (104) defined in the fluid channel layer (140).

Figure 7:
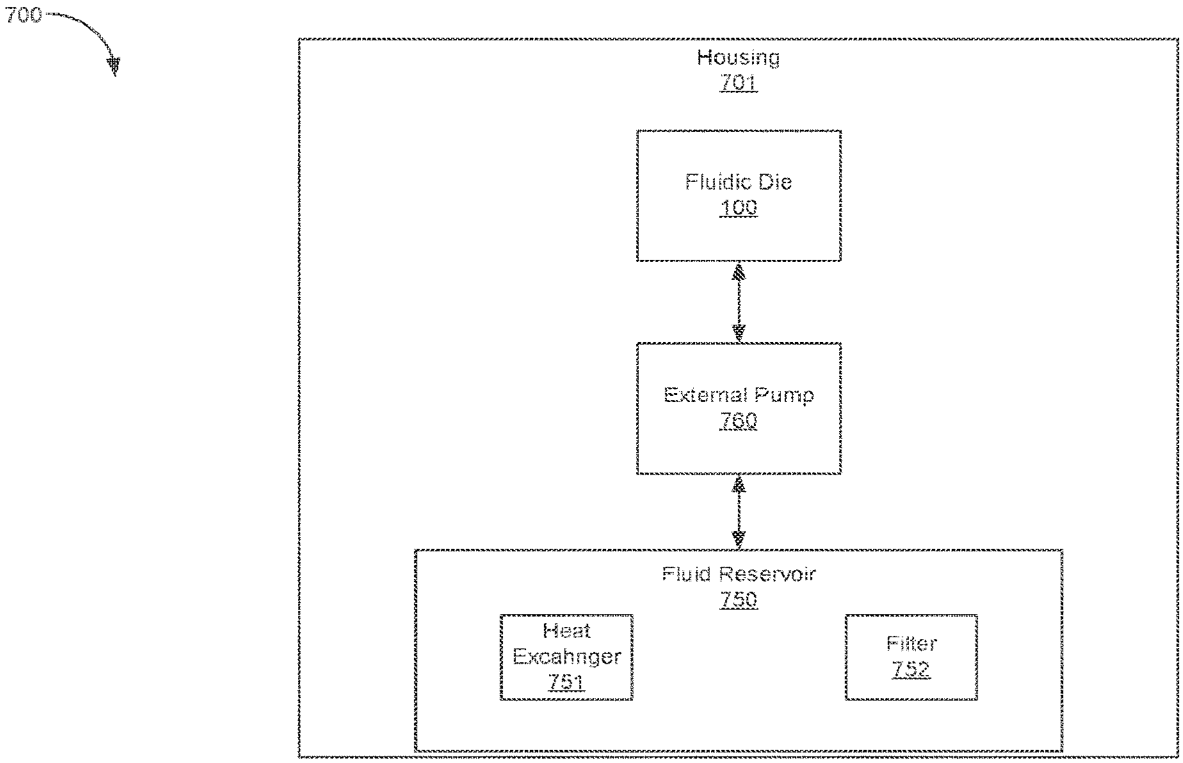
FIG. 7 is a block diagram of a printing fluid cartridge including the fluidic die of FIGS. 1A through 5, according to an example of the principles described herein.

FIG. 7 is a block diagram of a printing fluid cartridge including the fluidic die of FIGS. 1A through 5, according to an example of the principles described herein. The printing fluid cartridge (700) may be any system for recirculating fluid with the fluid ejection die (100), and may include a housing (701) to house at least one fluid ejection die (100). The housing (701) may also house a fluid reservoir (750) fluidically coupled to the fluid ejection die (100), and provides fluid to the fluid ejection die (100).

A number of external pumps (760) may be located inside and/or outside the housing (701). The external pump (760), coupled to the fluid reservoir (750), serves to pump fluid into and out of the fluid ejection die (100) as the fluid moves into and out of the fluid channels (104) by exerting a pressure difference sufficient to move the fluid through the fluid channels (104). The fluid reservoir (750) may also include a heat exchanger (751) to dissipate heat from the fluid as it returns back to the fluid reservoir (751) from the fluidic die (100). In one example, the fluid reservoir (750) may also include a filter (752) to filter any impurities from the fluid.

Figure 8:
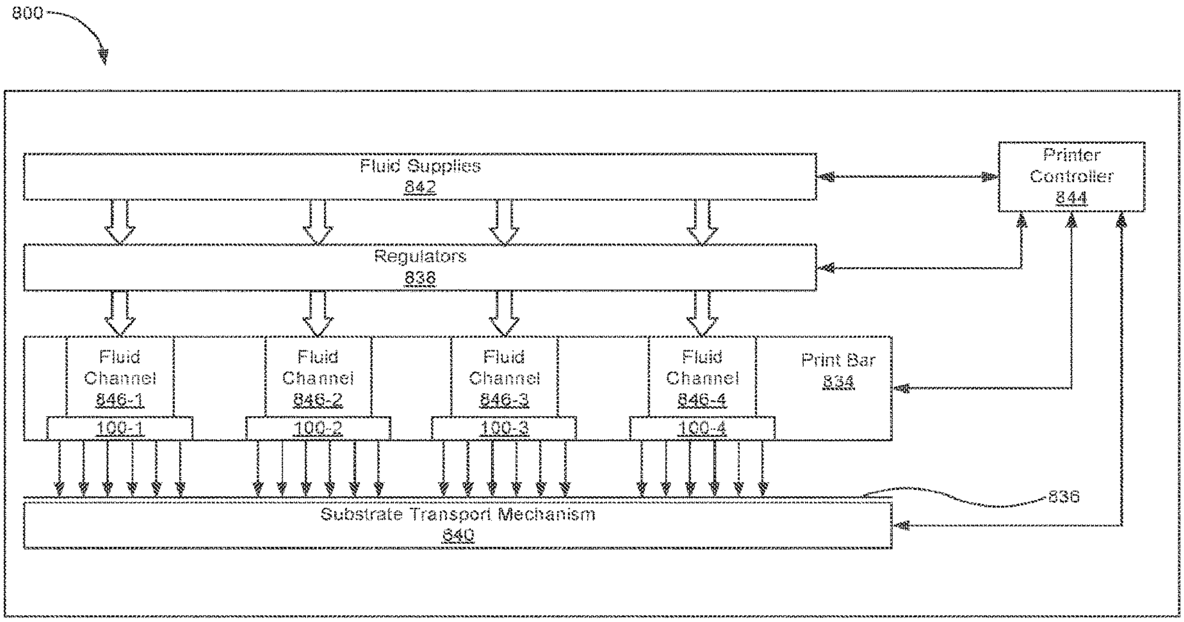
FIG. 8 is a block diagram of a printing device including a number of fluidic die in a substrate wide print bar, according to an example of the principles described herein.

FIG. 8 is a block diagram of a printing device (800) including a number of fluidic die (100) in a substrate wide print bar (834), according to an example of the principles described herein. The printing device (800) may include a print bar (834) spanning the width of a print substrate (836), a number of flow regulators (838) associated with the print bar (834), a substrate transport mechanism (840), printing fluid supplies (842) such as a fluid reservoir (FIG. 7, 750), and a controller (8544). The controller (844) represents the programming, processor(s), and associated memories, along with other electronic circuitry and components that control the operative elements of the printing device (800). The print bar (834) may include an arrangement of fluidic ejection dies (100) for dispensing fluid onto a sheet or continuous web of paper or other print substrate (836). Each fluid ejection die (100) receives fluid through a flow path that extends from the fluid supplies (842) into and through the flow regulators (838), and through a number of transfer molded fluid channels (846) defined in the print bar (834).

Figure 9:
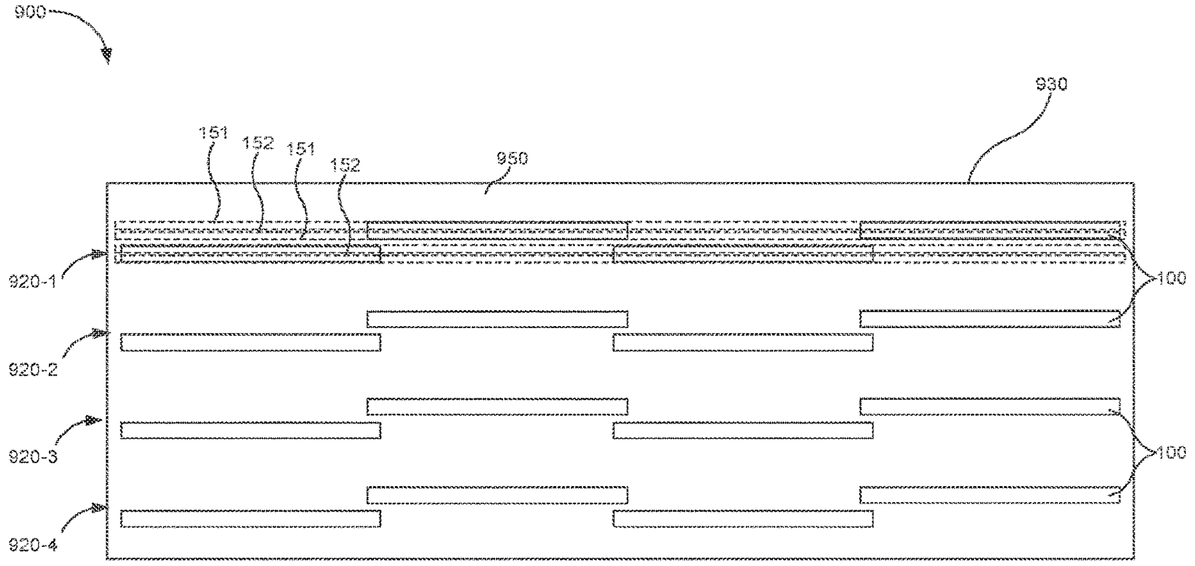
FIG. 9 is a block diagram of a print bar including a number of fluidic die, according to an example of the principles described herein.

FIG. 9 is a block diagram of a print bar (900) including a number of fluidic die (100), according to an example of the principles described herein. In some examples, the fluidic dies (100) may be embedded in an elongated, monolithic molding (950) such as an epoxy mold compound (EMC). The fluidic dies (100) may be arranged end to end in a number of rows (920-1, 920-2, 920-3, 920-4, collectively referred to herein as 920). In one example, the fluid ejection dies (100) may be arranged in a staggered configuration in which the fluid ejection dies (100) in each row (920) overlap another fluid ejection die (100) in that same row (920). In this arrangement, each row (920) of fluid ejection dies (100) receives fluid from at least one fluid slot (151, 152) as illustrated with dashed lines in FIG. 9. FIG. 9 depicts four fluid slots (151, 152) feeding a first row (920-1) of staggered fluid ejection dies (100). However, each row (920) may each include at least one fluid slot (151, 152). In one example, the print bar (900) may be designed for printing four different colors of fluid or ink such as cyan, magenta, yellow, and black. In this example, different colors of fluid may be dispensed or pumped into the individual fluid slots (151, 152).

In the examples described herein, a number of sensors may be placed within or adjacent to a number of the fluid flow passages within the fluidic die (100). Some examples of sensors that may be disposed within the fluid flow passages may include, for example, thermal sense resistors, strain gauge sensors, and flow sensors, among other types of sensors.

The specification and figures describe fluidic dies. The fluidic dies may include a fluid channel layer defining a number of fluid channels therein, a slot layer disposed on a side of the fluid channel layer, and a first fluid slot and a second fluid slot defined in the slot layer. At least one of the fluid channels fluidically couples the first fluid slot to the second fluid slot. The first fluid slot and the second fluid slot are defined in the slot layer along a length of the fluidic die.

The fluidic dies described herein brings cool electable fluid closer in proximity to the fluid ejection chambers and nozzles without creation of fluid channels in an SU8 layer.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluidic die, comprising:

a fluid channel layer defining a number of fluid channels therein, wherein the fluid channels form a number of ribs between the fluid channels;

a slot layer disposed on a side of the fluid channel layer; and a first fluid slot and a second fluid slot defined in the slot layer that run a length of the fluidic die, wherein:

at least one of the fluid channels is fluidically coupled at a first end to the first fluid slot and is fluidically coupled at a second end to the second fluid slot, and fluid flows from a first fluid channel to a row of fluid ejection chambers and into a second fluid channel, wherein the first fluid slot and the second fluid slot have a different alignment relative to rows of fluid ejection actuators in a fluid ejection layer of the fluidic die.

2. The fluidic die of claim 1, wherein the number of ribs comprise intermittent discontinuous structures along a length of the number of fluid channels.

3. The fluidic die of claim 1, wherein fluid ejection actuators in a fluid ejection layer of the fluidic die are formed over the number of ribs.

4. The fluidic die of claim 1, wherein fluid ejection actuators fluidically coupled to a particular fluid channel are formed over a shared rib.

5. The fluidic die of claim 1, wherein fluid not ejected from non-adjacent fluid channels is dumped into a common fluid channel between the non-adjacent fluid channels.

6. The fluidic die of claim 1, further comprising:

a fluid ejection actuator disposed in an inter-channel passage fluidically coupling adjacent fluid channels; and non-ejecting actuators disposed on either side of the fluid ejection actuator disposed in the inter-channel passage.

7. The fluidic die of claim 1, wherein at least one of the fluid channels is fluidically coupled to one of the first fluid slot and the second fluid slot.

8. The fluidic die of claim 7, further comprising a number of diversion walls to direct fluid from one fluid channel into another fluid channel.

9. The fluidic die of claim 8, wherein the number of diversion walls are perforated diversion walls.

10. The fluidic die of claim 8, wherein the number of diversion walls are partial diversion walls.

11. The fluidic die of claim 7, wherein the number of diversion walls are to prevent flow from entering the second fluid slot.

12. The fluidic die of claim 7, wherein the number of diversion walls are to prevent flow from entering the first fluid slot.

13. A system for recirculating fluid within a fluidic die, comprising:

a fluid reservoir;

a fluid channel layer defining a number of fluid channels therein, the fluid channel layer being fluidically coupled to the fluid reservoir, wherein the fluid channels form a number of ribs between the fluid channels;

a slot layer disposed on a side of the fluid channel layer fluidically proximal to the fluid reservoir; and a first fluid slot and a second fluid slot defined in the slot layer, wherein:

at least one of the fluid channels is fluidically coupled at a first end to the first fluid slot and is fluidically coupled at a second end to the second fluid slot; and the first fluid slot and the second fluid slot are defined in the slot layer along a length of the fluidic die, wherein the first fluid slot and the second fluid slot have a different alignment relative to rows of fluid ejection actuators in a fluid ejection layer of the fluidic die.

14. The system of claim 13, further comprising a fluid feed hole substrate comprising a number of fluid feed holes to deliver fluid from the number of fluid channels to ejection chambers formed in a fluid ejection layer of the fluidic die.

15. The system of claim 14, wherein the fluid feed hole substrate comprises an inlet fluid feed hole and an outlet fluid feed hole per ejection chamber.

16. The system of claim 14, wherein fluid flow through the fluid feed holes is perpendicular to fluid flow through the number of fluid channels.

17. The system of claim 13, further comprising a fluid ejection layer directly coupled to the fluid channel layer.

18. The system of claim 13, further comprising a fluid ejection layer fluidically coupled to the number of fluid channels, wherein:

the fluid ejection layer comprises fluid ejection actuators disposed in rows; and rows of fluid ejection actuators are straight; and the number of fluid channels are angled.

* * * * *